(12) United States Patent
Lersch et al.

(10) Patent No.: US 7,722,974 B2
(45) Date of Patent: May 25, 2010

(54) FUEL CELL MODULE COMPRISING A MAGNETIC SHIELDING

(75) Inventors: Josef Lersch, Heroldsbach (DE); Arno Mattejat, Bubenreuth (DE); Karl Strasser, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 858 days.

(21) Appl. No.: 10/433,052

(22) PCT Filed: Nov. 21, 2001

(86) PCT No.: PCT/DE01/04392

§ 371 (c)(1),
(2), (4) Date: Aug. 29, 2003

(87) PCT Pub. No.: WO02/45193

PCT Pub. Date: Jun. 6, 2002

(65) Prior Publication Data

US 2004/0033411 A1    Feb. 19, 2004

(30) Foreign Application Priority Data

Nov. 30, 2000 (DE) ................................ 100 59 568

(51) Int. Cl.
*H01M 8/02* (2006.01)
*H01M 8/24* (2006.01)

(52) U.S. Cl. ........................... 429/34; 429/12; 429/127; 429/176; 429/149; 429/153; 429/163; 429/168

(58) Field of Classification Search ................... 429/34, 429/12, 176, 149, 153, 163, 168
See application file for complete search history.

(56) References Cited

U.S. PATENT DOCUMENTS 4,175,165 A    11/1979    Adlhart (Continued)

FOREIGN PATENT DOCUMENTS

DE    28 31 799 C2    2/1979

(Continued)

OTHER PUBLICATIONS

Maryland Metrics: Materials-Miscellaneous Steel Grades, P.O. Box 261, Owings Mills, MD USA, 6119 Oakleaf Avenue, Baltimore, MD 21215.*

(Continued)

*Primary Examiner*—Dah-Wei Yuan
*Assistant Examiner*—Angela J. Martin
(74) *Attorney, Agent, or Firm*—Harness, Dickey & Pierce, P.L.C.

(57) ABSTRACT

A fuel cell module includes a plurality of fuel cells, which are connected one behind the other and which are combined to form a fuel cell stack. The fuel cell module should be designed in such a manner that the magnetic field or leakage field, which can be detected in the outer area and which is generated during the operation of the fuel cell module, is held at a particularly low level. To this end, the materials used for providing the fuel cells themselves, the materials used for producing the connecting components or auxiliary components, which are assigned thereto, that connect these fuel cells, and the materials used for producing the housing are selected that have a relative magnetic permeability of less than 1.1.

40 Claims, 1 Drawing Sheet

U.S. PATENT DOCUMENTS

| | | | |
|---|---|---|---|
| 5,235,243 A | | 8/1993 | Tong |
| 5,460,897 A | * | 10/1995 | Gibson et al. ............... 429/39 |
| 5,851,689 A | * | 12/1998 | Chen ........................ 429/13 |
| 6,274,258 B1 | * | 8/2001 | Chen ........................ 429/13 |
| 6,306,533 B1 | * | 10/2001 | Mund et al. ................ 429/26 |
| 6,326,096 B1 | * | 12/2001 | Virkar et al. ............... 429/30 |
| 6,379,476 B1 | * | 4/2002 | Tarutani et al. ............ 148/325 |
| 6,440,598 B1 | * | 8/2002 | Fukui et al. ................ 429/34 |
| 6,635,378 B1 | * | 10/2003 | Yang et al. ................. 429/34 |
| 2003/0096147 A1 | * | 5/2003 | Badding et al. ............ 429/30 |
| 2004/0101733 A1 | * | 5/2004 | Yamanis et al. ............ 429/34 |
| 2005/0042491 A1 | * | 2/2005 | Horiuchi et al. ............ 429/32 |

FOREIGN PATENT DOCUMENTS

| | | | |
|---|---|---|---|
| DE | 197 24 428 C2 | | 12/1998 |
| EP | 1001666 | | 5/2000 |
| EP | 1001666 A2 | * | 5/2000 |
| EP | 1046723 | | 10/2000 |
| JP | 58-206070 | | 12/1983 |
| JP | 62-287576 | | 12/1987 |
| JP | 2-206101 A | | 8/1990 |
| JP | 06264193 | * | 9/1994 |
| JP | 06-293941 | * | 10/1994 |
| JP | 8-236129 | | 9/1996 |
| JP | 2000-309854 | * | 11/2000 |

OTHER PUBLICATIONS

GL-Germanischer Lloyd Ag, Approved Welding Consumables, GL-Group.com.* www.azom.com/details.asp?ArticleID=1140, stainless steel-magnetic properties, pp. 1-3.*

Taruya Yoshio; "Metallic Material for Solid Electrolyte Type Fuel Cell"; Patent Abstract of Japan; © 1994.

* cited by examiner

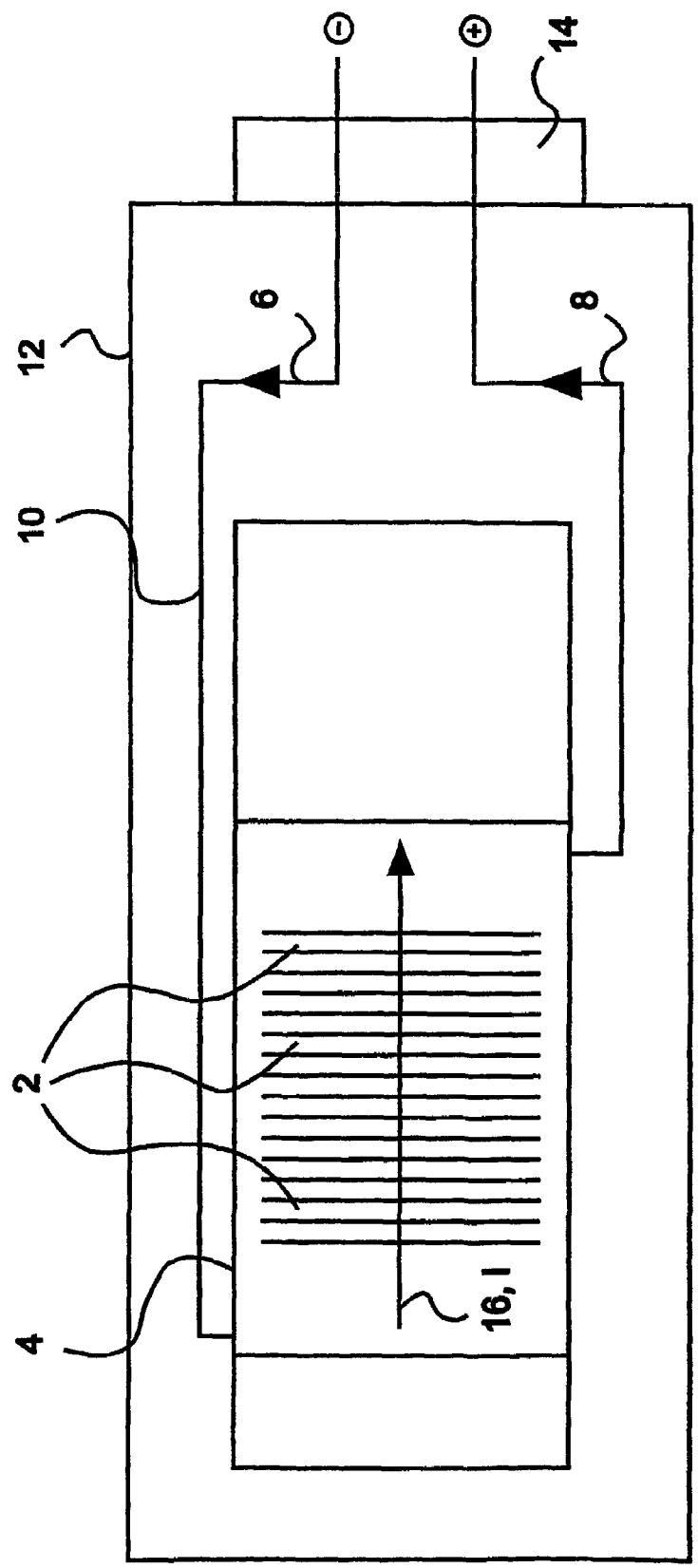

FUEL CELL MODULE COMPRISING A MAGNETIC SHIELDING

This application is the national phase under 35 U.S.C. §371 of PCT International Application No. PCT/DE01/04392 which has an International filing date of Nov. 21, 2001, which designated the United States of America and which claims priority on German Patent Application number DE 100 59 568.5 filed Nov. 30, 2000 the entire contents of which are hereby incorporated herein by reference.

FIELD OF THE INVENTION

The invention generally relates to a fuel cell module having a number of fuel cells arranged in a housing and electrically connected in series.

BACKGROUND OF THE INVENTION

Fuel cells can be used for the environmentally friendly generation of electricity. In a fuel cell, a process which substantially represents a reversal of electrolysis takes place. For this purpose, in a fuel cell, a fuel which includes hydrogen is fed to an anode. Further, an auxiliary substance which includes oxygen is fed to a cathode. The anode and cathode are electrically separated from one another by an electrolyte layer.

Although the electrolyte layer allows ion exchange between the fuel and the oxygen, it otherwise ensures gastight separation of the fuel and auxiliary substance. As a result of the ion exchange, hydrogen which is present in the fuel can react with the oxygen to form water, with electrons accumulating at the fuel-side electrode or anode and electrons being taken up at the electrode on the side of the auxiliary substance, or the cathode.

Therefore, when the fuel cell is operating, a usable potential difference or voltage builds up between anode and cathode, while the only waste product of the electricity generation process is water. The electrolyte layer, which in the case of a high-temperature fuel cell may be formed as a solid ceramic electrolyte or in the case of a low-temperature fuel cell may be formed as a polymer membrane, therefore has the function of separating the reactants from one another, transferring the charge in the form of ions and preventing an electron short circuit.

A fuel cell comprises a flat electrolyte, one flat side of which is adjoined by a flat anode and the other flat side of which is adjoined by a cathode, which is likewise flat. These two electrodes, together with the electrolyte, form what is known as an electrolyte electrode assembly. Adjacent to the anode there is an anode gas space, and adjacent to the cathode there is a cathode gas space.

An interconnector plate is arranged between the anode gas space of a fuel cell and the cathode gas space of a fuel cell adjacent to this fuel cell. The interconnector plate produces an electrical connection between the anode of the first fuel cell and the cathode of the second fuel cell. Depending on the type of fuel cell, the interconnector plate is designed, for example, as a single metallic plate or as a cooling element which comprises two plates stacked on top of one another with a cooling-water space between them. Depending on the type of fuel cell, there are further components, such as for example electrically conductive layers, seals or pressure cushions, in a fuel cell stack.

On account of the electrochemical potentials of the materials which are customarily used, in a fuel cell of this type an electrode voltage of approximately 0.6 to 1.0 V can be built up under normal operating conditions and maintained during operation. For industrial applications, in which a significantly higher total voltage may be required, depending on the intended use or the planned load, therefore, it is customary for a plurality of fuel cells to be electrically connected in series in the form of a fuel cell stack. The fuel cells are stacked in such a manner that the sum of the electrode voltages supplied by the fuel cells corresponds to the required total voltage or exceeds this total voltage. Depending on the total voltage required, the number of fuel cells in a fuel cell stack of this type may, for example, amount to 50 or more.

To make it possible to utilize the potential difference generated when the fuel cells which have been connected up to form a fuel cell stack of this type are operating, the fuel cell stack is connected to a load. In this case, for electrical connection of the load to the fuel cell stack, there is what is known as a terminal plate, to which electrical supply and discharge lines can be connected, arranged at the two outermost fuel cells of the fuel cells which are connected in series.

On account of the particular operating properties of fuel cells of this type, and in particular since water is the only significant by-product produced, fuel cells are also particularly suitable for use for supplying energy in closed mobile systems, such as for example underwater vessels. In this context, it is particularly advantageous that a relatively high output current can be achieved at a standard voltage level in the form of a relatively high power density in a fuel cell arrangement with only limited spatial dimensions. Moreover, particularly for use in underwater vessels, the fuel, i.e. the substance which includes hydrogen, can be provided in relatively compact form. The auxiliary substance or oxidizing agent used may in this case be pure oxygen. The hydrogen may in this case in particular be carried along in hydride tanks.

Particularly when fuel cells are used in an underwater vessel, it may be desirable for the signature emitted to the outside, i.e. the externally detectable signs indicating the location or operation of the underwater vessel, to be kept at a particularly low level. This signature may also include magnetic fields which are generated by the currents flowing in and out when fuel cells are operating.

SUMMARY OF THE INVENTION

Therefore, an embodiment of the invention is based on an object of providing a fuel cell module having a number of fuel cells which are arranged in a housing and are electrically connected in series. Further, the magnetic field or leakage field which can be detected in its outer region is kept at a particularly low level.

According to an embodiment of the invention, an object may be achieved by both the housing and the terminal plates and the interconnector plates being made from materials which have a relative magnetic permeability ($\mu_r$) of less than 1.1.

The relative permeability $\mu_r$ is in this case a material-dependent proportionality constant between the magnetic field strength H and the magnetic induction or flux density B. The relative magnetic permeability $\mu_r$ in particular indicates how the material in question contributes to the overall magnetic field strength H produced in response to a predetermined external magnetic flux density B as a result of its structural or molecular properties.

An embodiment of the invention is based on the consideration that the magnetic field which can be detected in the outer region of the fuel cell module may be composed of both active and passive contributions. To keep the magnetic field which can be detected in the outer region of the fuel cell module at a particularly low level, therefore, both of these contributions should be kept at particularly low levels independently of one another. With regard to the active contributions, which are induced, for example, by the operating current when the fuel cell module is operating, this can result in design stipulations relating to the passage of current when the fuel cell module is operating.

In addition, however, the passive contribution, i.e. the component which is additionally formed in response to an externally predetermined magnetic field or in response to the magnetic field generated by the operating current which is flowing, should also be kept at a particularly low level. One measure of a contribution of this type is the relative magnetic permeability $\mu_r$. Therefore, the materials of the fuel cell module are selected in such a manner that their relative magnetic permeability $\mu_r$ and therefore the contribution which occurs in response to a predetermined magnetic field is kept at a particularly low level.

Examples of advantageous materials are nonmetallic materials or austenitic steels. They have the required low permeability and are particularly resistant to chemical attacks.

It is expedient for both the materials which are used to provide the fuel cells per se and the materials which are used to produce connecting components which connect the fuel cells, or associated auxiliary components, and the materials used for the housing to have a relative magnetic permeability of less than 1.1. As a result, relatively highly magnetic materials and therefore a high signature are avoided altogether.

Each fuel cell usually includes a number of carrier cards, which are also referred to as cooling cards, each enclose gas and/or coolant spaces and are provided with a contact plate. These functional components, which are of significance to the actual fuel cell, are advantageously formed from a graphite-doped plastic body provided with a protective layer based on Ti. In this case, on the one hand the choice of the plastic-bonded graphite as the main material for the abovementioned components ensures that these components have a particularly low relative magnetic permeability $\mu_r$ and are therefore substantially completely nonmagnetic. On the other hand, the protective layer which is based on Ti ensures that the respective functional component can be operated even in a relatively aggressive atmosphere or environment without being significantly adversely affected. This is because when the fuel cell is operating these components are usually exposed to a relatively aggressive atmosphere, for example a pure oxygen atmosphere, and consequently it is necessary to reckon with high levels of corrosion.

To make the abovementioned components able to resist corrosion of this type even when plastic-bonded graphite is selected as the main material, they are advantageously provided with a protective layer based on Ti, in the form of a passivation.

In an alternative or additional advantageous configuration, those components of the fuel cell module which, during operation, are exposed to contact with a reactant of the or each fuel cell are, at least in a surface region, made from an alloy based on nickel. This is because selecting a material of this type firstly ensures that the relative magnetic permeability $\mu_r$ can be kept at a particularly low level.

Secondly, a material of this type is relatively insensitive to corrosion and can therefore operate reliably even in contact with the relatively aggressive atmosphere of the reactants with a particularly long operating time. Accordingly, in particular the components which are directly exposed to the electrochemical process in a fuel cell, such as for example terminal plates, busbars and/or interconnector plates, such as cooling cards, may be made from a nickel-based alloy of this type.

In a further advantageous configuration, the surface region has an alloying constituent of approximately 50% or more of nickel. In this case, it is possible in particular to use a nickel-based alloy which is also known as Hastelloy and comprises as alloying constituents approximately 50% of Ni, 15% of Cr, 15% of Mo and a relatively small amount of Fe. An alloy of this type has a relative magnetic permeability $\mu_r$ of less than 1.08 and is therefore particularly suitable for use in the fuel cell module. Alternatively, the Cr constituent could also be replaced by another suitable component.

Within a fuel cell module, the actual fuel cells are usually also assigned auxiliary components, referred to as operating parts, or process technology devices, such as, for example, valves, measuring equipment, sensors, pipes, flexible tubes or separators. These auxiliary components, unlike the core components listed above, are not directly exposed to the reactants or the electrochemical process when the fuel cell module is operating.

In order, on the one hand, to reliably ensure that these auxiliary components have a sufficiently low magnetic permeability $\mu_r$ and on the other hand to also keep production outlay at a particularly low level, these auxiliary components are preferably made from stainless steel. In particular, they are preferably made from a stainless steel which can only be magnetized to a very small extent or an alloy based on nickel. If the auxiliary components are based on nickel, their material advantageously includes an alloying constituent of approximately 50% of Ni. Therefore, in a particularly advantageous configuration, the abovementioned material, which is also known as Hastelloy, is also used for these components.

If the abovementioned auxiliary components are made from stainless steel, the material used is advantageously a nitrogen-stabilized stainless steel which can only be magnetized to a very slight extent and which is available as material type 1.3954, 1.3964 or 1.3974. Further stainless steels of this type which may be suitable are those which bear the designations 1.3802, 1.3805, 1.3813, 1.3815, 1.3817, 1.3819, 1.3941, 1.3949, 1.3952, 1.3953, 1.3958, 1.3960, 1.3962, 1.3965, 1.3967 and 1.3968.

The advantages achieved by at least one embodiment of the invention reside, in particular, in the fact that, as a result of exclusively materials which have a low relative magnetic permeability $\mu_r$ of less than approximately 1.1 being selected both for the fuel cells per se and for the connecting or auxiliary components used and also for the housing of the fuel cell module, the components or parts can only be magnetized to a relatively slight extent. Therefore, these components or their material only cause a relatively slight amplification of the magnetic field which is present locally and generated by external influences or else by the operating current. Therefore, the fuel cell module has a particularly insignificant signature in its outer region.

BRIEF DESCRIPTION OF THE DRAWINGS

An exemplary embodiment of the invention is explained in more detail with reference to a drawing, in which:

The FIGURE diagrammatically depicts a fuel cell module.

DETAILED DESCRIPTION OF THE PREFERRED EMBODIMENTS

The fuel cell module 1 shown in the FIGURE comprises a plurality of fuel cells 2 which are combined in the form of a fuel cell stack and which are electrically connected in series. The fuel cells 2 form a fuel cell block which is surrounded by an inner housing 4 and is electrically connected to an electric load (not shown in more detail) on the input side via a line 6 and on the output side via a line 8.

The fuel cells 2 which are connected up to form the fuel cell stack are assigned a number of auxiliary components (not shown in more detail), such as valves, measuring equipment, sensors, tubes, pipes or separators, which are arranged in a common housing segment 10 outside the inner housing 4. The inner housing 4 and the housing segment 10 mounted on it are arranged in an outer housing 12 which surrounds them jointly in the manner of a jacket housing and which is used to protect the fuel cell module 1 both mechanically and against leaks. The lines 6, 8, in a connection region, are guided through a connection piece 14 flanged onto the outer housing 12 into the outer region of the housing 12.

When it operates, the fuel cell module 1 is designed to generate a particularly low signature level which can be detected externally. For this purpose, the fuel cell module 1 is designed in such a manner that, when it operates, both the magnetic field which is actively generated by the operating current I, denoted by arrow 16 in the FIGURE, and the additional magnetic field generated by the response of the materials to this magnetic field or a magnetic field which is externally imposed are kept at particularly low levels. For this purpose, on the one hand the lines 6, 8 and further line sections and components (not shown in more detail in the exemplary embodiment) are arranged in such a manner that the magnetic fields generated by the currents flowing therein in the outer region are substantially compensated for and therefore there is only a particularly low residual magnetic field. To keep the contribution made by the fuel cell module 1 with regard to the passive magnetic fields at a particularly low level as well, furthermore, all the materials used are selected in such a manner that they have a relative magnetic permeability $\mu_r$ of less than 1.1.

For this purpose, both the materials used to provide the fuel cells 2 per se and the materials used to produce connecting components which connect the fuel cells 2 or the auxiliary components arranged in the housing segment 10 and the materials used for the inner housing 4, the housing segment 10 and the outer housing 12 are selected with a correspondingly low relative magnetic permeability $\mu_r$.

The fuel cells 2 have interconnector plates, which are also referred to as carrier cards and which are designed as cooling cards. They surround a cooling-water space and, with the aid of passages or stamped structures, in combination with one another or in combination with the electrolyte electrode assembly, form gas spaces through which the fuel (a hydrogen-containing gas) and the auxiliary substance (an oxygen-containing gas) flow. These plates are mainly formed from a graphite-doped plastic body. This plastic body, which is also referred to as plastic-bonded graphite, is virtually nonmagnetic and has a relative magnetic permeability $\mu_r$ of approximately 1.0. Alternatively, it is also possible for the main material used to be an alloy based on nickel or a stainless steel. In order for these components, which during operation are exposed to the electrochemical processes and therefore to a particularly aggressive atmosphere from the reactants, additionally also to be designed for a particularly long operating time, the plastic body is in each case provided with a protective layer based on titanium. The terminal plates are made from an alloy based on nickel. In this case, the material used is an alloy which, as alloying constituent, contains 50% of Ni, 15% of Cr, 15% of Mo and a small residual quantity of Fe and is also known as Hastelloy.

The auxiliary components arranged in the housing segment 10 may likewise be made from a nickel-based alloy of this type.

In the exemplary embodiment, however, the auxiliary components are made from stainless steel, in which case, on the one hand, there is likewise a particularly low relative magnetic permeability $\mu_r$ and also, on the other hand, the corrosion resistance is sufficient in particular for use in the housing segment 10. For this purpose, the auxiliary components are made from stainless steel which cannot be magnetized and is particularly stabilized by the addition of nitrogen. In the exemplary embodiment, the material provided is the stainless steel available under material number 1.3964. Alternatively, however, it is also possible to use the stainless steel available under material number 1.3954 or material number 1.3974.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A fuel cell module, comprising:
    a fuel cell stack including a plurality of fuel cells electrically connected in series, arranged in an inner housing, and delimited by two terminal plates, wherein the plurality of fuel cells form a fuel cell block,
    each of the fuel cells including an electrolyte electrode assembly adjoined by two interconnector plates, wherein the inner housing, the terminal plates and the interconnector plates are made from materials which have a relative magnetic permeability of less than 1.1 and the two interconnector plates are designed as cooling cards that surround a cooling-water space, and
    said two terminal plates are conductors for electrically connecting a load to the fuel cell stack.

2. The fuel cell module as claimed in claim 1, wherein the inner housing, the terminal plates and the interconnector plates are made from a material selected from the group consisting of nonmetallic materials and austenitic steel.

3. The fuel cell module as claimed in claim 1, wherein the materials used to provide the fuel cells, the materials used to produce at least one of connecting components which connect them and associated auxiliary components, and the materials used for the inner housing, include a relative magnetic permeability of less than 1.1.

4. The fuel cell module as claimed in claim 1, wherein the cooling cards enclose at least one of gas and the cooling-water space, and are provided with a contact plate.

5. The fuel cell module as claimed in claim 1, wherein components which are exposed to contact with a reactant of at least one fuel cell during operation, are produced, at least in a surface region, from an alloy based on nickel.

6. The fuel cell module as claimed in claim 5, wherein the surface region includes an alloying constituent of approximately 50% of Ni.

7. The fuel cell module as claimed in claim 1, wherein auxiliary components of the fuel cell module are made from a material selected from the group consisting of stainless steel and an alloy based on nickel.

8. The fuel cell module as claimed in claim 7, wherein the material of the auxiliary components includes an alloying constituent of approximately 50% of Ni.

9. The fuel cell module as claimed in claim 7, wherein the auxiliary components are made from a stainless steel selected from the group consisting of type 1.3954, 1.3964 and 1.3974.

10. The fuel cell module as claimed in claim 2, wherein the materials used to provide the fuel cells, the materials used to produce at least one of connecting components which connect them and associated auxiliary components, and the materials used for the inner housing, include a relative magnetic permeability of less than 1.1.

11. The fuel cell module as claimed in claim 2, wherein the cooling cards enclose at least one of gas and the cooling-water space, and are provided with a contact plate.

12. The fuel cell module as claimed in claim 3, wherein the cooling cards enclose at least one of gas and the cooling-water space, and are provided with a contact plate.

13. The fuel cell module as claimed in claim 2, wherein components which, during operation are exposed to contact with at least one of a reactant and each fuel cell, are produced, at least in a surface region, from an alloy based on nickel.

14. The fuel cell module as claimed in claim 13, wherein the surface region includes an alloying constituent of approximately 50% of Ni.

15. The fuel cell module as claimed in claim 2, wherein auxiliary components of the fuel cell module are made from a material selected from the group consisting of stainless steel and an alloy based on nickel.

16. The fuel cell module as claimed in claim 15, wherein the material of the auxiliary components includes an alloying constituent of approximately 50% of Ni.

17. The fuel cell module as claimed in claim 15, wherein the auxiliary components are made from a stainless steel selected from the group consisting of type 1.3954, 1.3964 and 1.3974.

18. The fuel cell module as claimed in claim 3, wherein components which, during operation are exposed to contact with at least one of a reactant and each fuel cell, are produced, at least in a surface region, from an alloy based on nickel.

19. The fuel cell module as claimed in claim 18, wherein the surface region includes an alloying constituent of approximately 50% of Ni.

20. The fuel cell module as claimed in claim 3, wherein auxiliary components of the fuel cell module are made from a material selected from the group consisting of stainless steel and an alloy based on nickel.

21. The fuel cell module as claimed in claim 20, wherein the material of the auxiliary components includes an alloying constituent of approximately 50% of Ni.

22. The fuel cell module as claimed in claim 20, wherein the auxiliary components are made from a stainless steel selected from the group consisting of type 1.3954, 1.3964 and 1.3974.

23. A fuel cell module, comprising:
an inner housing; and
a plurality of fuel cells, electrically connected in series forming a fuel cell stack, arranged in the inner housing, wherein the plurality of fuel cells form a fuel cell block, wherein the fuel cell stack is delimited by two terminal plates, said two terminal plates being conductors for electrically connecting a load to the fuel cell stack, and further wherein the inner housing, the two terminal plates, the fuel cells and interconnections of the fuel cells are made from materials which have a relative magnetic permeability of less than 1.1, and the interconnections designed as cooling cards that surround a cooling-water space.

24. The fuel cell module of claim 23, further comprising a plurality of auxiliary components, associated with the fuel cell stack and arranged in a housing segment outside the inner housing.

25. The fuel cell module of claim 24, wherein the auxiliary components and the housing segment are made from materials which have a relative magnetic permeability of less than 1.1.

26. The fuel cell module of claim 25, further comprising an outer housing, surrounding both the inner housing and the housing segment.

27. The fuel cell module of claim 26, wherein the outer housing is made from materials which have a relative magnetic permeability of less than 1.1.

28. The fuel cell module of claim 23, wherein each of the fuel cells include an electrolyte electrode assembly adjoined by two interconnector plates, each made from materials which have a relative magnetic permeability of less than 1.1.

29. The fuel cell module of claim 28, further comprising a plurality of auxiliary components, associated with the fuel cell stack and arranged in a housing segment outside the inner housing, wherein the auxiliary components and the housing segment are made from materials which have a relative magnetic permeability of less than 1.1.

30. The fuel cell module of claim 29, further comprising an outer housing, surrounding both the inner housing and the housing segment, wherein the outer housing is made from materials which have a relative magnetic permeability of less than 1.1.

31. The fuel cell module as claimed in claim 25, wherein auxiliary components of the fuel cell module are made from a material selected from the group consisting of stainless steel and an alloy based on nickel.

32. The fuel cell module as claimed in claim 31, wherein the material of the auxiliary components includes an alloying constituent of approximately 50% of Ni.

33. The fuel cell module as claimed in claim 31, wherein the auxiliary components are made from stainless steel selected from the group consisting of type 1.3954, 1.3964 and 1.3974.

34. The fuel cell module as claimed in claim 4, wherein the plurality of carrier cards are each formed from a graphite-doped plastic body provided with a protective layer based on Ti.

35. The fuel cell module as claimed in claim 11, wherein the plurality of carrier cards are each formed from a graphite-doped plastic body provided with a protective layer based on Ti.

36. The fuel cell module as claimed in claim 12, wherein the plurality of carrier cards are each formed from a graphite-doped plastic body provided with a protective layer based on Ti.

37. The fuel cell module of claim 1, further comprising a plurality of auxiliary components associated with the fuel cell stack, the auxiliary components being arranged in a housing segment outside the inner housing.

38. The fuel cell module of claim 37, wherein the auxiliary components and the housing segment are made from materials which have a relative magnetic permeability of less than 1.1.

39. The fuel cell module of claim 37, further comprising an outer housing wherein the inner housing and the housing segment are arranged in the outer housing.

40. The fuel cell module of claim 39, wherein the outer housing is made from materials which have a relative magnetic permeability of less than 1.1.

* * * * *